UNITED STATES PATENT OFFICE.

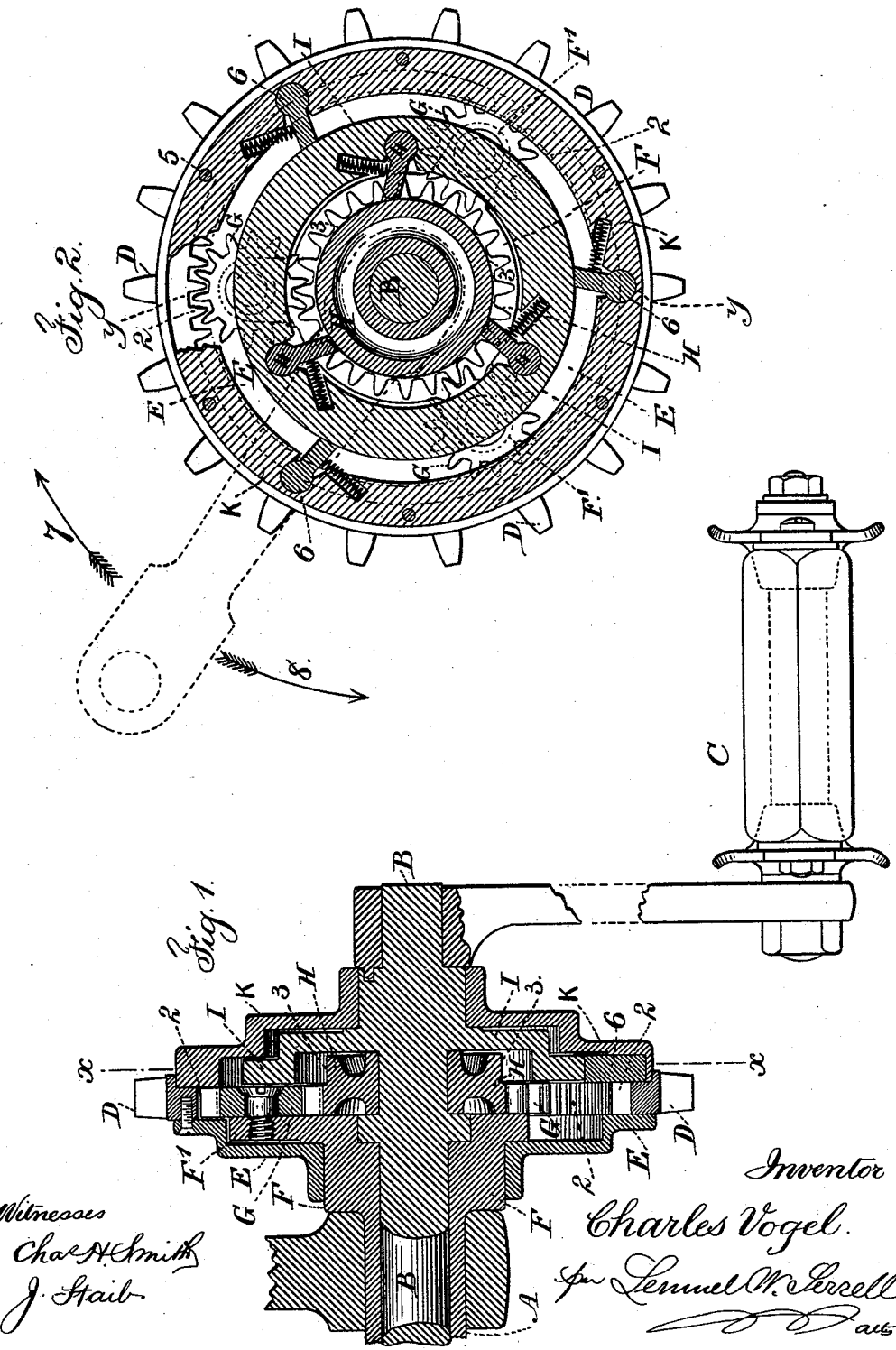

CHARLES VOGEL, OF FORT LEE, NEW JERSEY.

SPEED-GEAR FOR VELOCIPEDES.

SPECIFICATION forming part of Letters Patent No. 479,177, dated July 19, 1892.

Application filed September 24, 1891. Serial No. 406,647. (No model.)

*To all whom it may concern:*

Be it known that I, CHARLES VOGEL, a citizen of the United States, residing at Fort Lee, in the county of Bergen and State of New Jersey, have invented an Improvement in Variable-Speed Gears for Velocipedes, of which the following is a specification.

Sun-and-planet gears have been provided for giving variable speeds to mechanism, and in some instances this character of gear has been applied to the chain-wheel of a velocipede, so that the chain-wheel may revolve with and at the same speed as the treadle; or by the intervention of the sun-and-planet gears the speed of the chain-wheel may be reduced, so that the treadle exerts the required power upon such chain-wheel. In these cases, however, such mechanism has been brought into action by hand, and the connecting devices for the clutch mechanism being outside of the inclosure for the gearing has rendered it necessary to provide openings through such inclosure that are liable to become obstructed and that admit dirt and dust to the gearing.

My present invention is made for tightly inclosing the gearing and for varying the relative speeds automatically—that is to say, when the cranks or treadles are rotated in one direction the automatic devices connect such treadles with the chain-wheel, so that the latter moves at the same speed as the former; but when the treadles are rotated in the reverse direction the sun-and-planet gearing is brought automatically into action, so that the chain-wheel is rotated at a slower speed and with greater power.

In the drawings, Figure 1 is a vertical section of the chain-wheel longitudinally of the treadle-shaft and at the line $y\ y$ of Fig. 2, and Fig. 2 is a transverse section at the line $x\ x$ of Fig. 1 and partly broken open to show the gearing.

The tubular fixed bearing A is supported by the frame of the bicycle or tricycle in any suitable manner, and within it is the crank-shaft B, at the ends of which are suitable cranks or pedals, one of which is represented at C. The chain-wheel D is adapted to receive any desired character of chain to the chain-wheel upon the axle of the driver, and this chain-wheel D is connected to or formed with the hub-plate E, which is free to revolve around the collar F or bearing upon the exterior of the tubular bearing A, and this collar F is provided with arms F', carrying studs for the pinions G, the teeth of which gear into the teeth 2 around upon the inside of the chain-wheel D, and the studs or arbors of the pinions G remain in a fixed position.

Between the pinions G is the sun-wheel H, the teeth of which gear into the pinions G, and this wheel H is loose upon the crank-shaft B, and it is provided with a cylindrical flange 3, and upon the crank-shaft B is a disk I, made with or permanently fastened to such crank-shaft, and the cylindrical flange or rim of this disk I surrounds the cylindrical flange 3 when the parts are put together, and there are friction pawls or clutches 4 pivoted upon the disk I, with their ends resting against the cylindrical flange 3 to grasp and rotate the same and the wheel H when the crank-shaft is turned in one direction, but the pawls slide over the flange 3 when the crank-shaft is rotated in the opposite direction. These pawls may be friction-pawls, or they may engage ratchet-teeth when there are such teeth cut in the cylindrical flange 3.

Around the crank-shaft B is a face-plate K, that is hollow and secured near its edge by the screws 5 to the side of the chain-wheel D, and the rim of this hollow face-plate surrounds the disk I, and there are within the rim of the face-plate K pawls 6, that act in the opposite direction to the pawls 4, and these pawls 6 are represented as friction-pawls that grasp the edge of the disk I, but the edge of the disk I may be provided with ratchet-teeth to engage the ends of the pawls 6. I have represented springs for the pawls 4 and the pawls 6, that tend to swing the pawls and keep their ends in contact with the respective surfaces. It will be now understood that when the crank-shaft is being rotated in the direction of the arrow 7 the pawls 6 upon the face-plate K engage the edge of the disk I, and the motion of the crank-shaft is communicated directly to the face-plate K and chain-wheel D, so that the latter makes one rotation for each rotation of the crank-shaft, the parts being locked and moving together; but during that motion the teeth 2 upon the interior of the chain-wheel rotate the planet-pinions G and the wheel H in the opposite direction to the chain-wheel, and hence the flange 3 of the wheel H slides freely beneath the pawls 4. When the crank-shaft B is rotated in the opposite direction by the movements of the feet upon the cranks or pedals, the disk I is directly connected to the cylindrical flange 3 of the wheel H by the pawls 4, so that such pawls 4 give rotation to the sun-wheel H, and this acting through the pinions G communicates motion to the chain-wheel D through its teeth 2, and this chain-wheel is revolved in the proper direction—that is to say, in the same direction that it had been revolved by the direct connection thereto of the treadles—so that the velocipede is propelled forward, but at a slower rate of speed in proportion to the movements of the treadles, because the wheel H has to make more than one rotation to communicate a complete rotation to the chain-wheel by the internal gear thereof, and the party riding the velocipede can ascend a hill or propel the machine at a slower speed with a less pressure of the feet by simply reversing the direction in which he rotates the pedals by his feet. During the slower and more powerful movement given, as aforesaid the pawls 6 are out of action, because the edge of the disk I is moving within the same in the direction of the arrow 8. By this construction the driving-gears are entirely excluded from dust and dirt and the attendant does not have to make any changes or operate any pawls by his hands when driving the pedals for obtaining the necessary power and a slower speed.

I have represented the pawls 4 and 6 as having cylindrical heads received into recesses; but such pawls may be made in any desired manner to operate by friction or otherwise.

I claim as my invention—

1. The combination, with a chain-wheel for a bicycle or similar vehicle, of a crank or pedal shaft, a stationary bearing through which the crank-shaft passes and around which the hub of the chain-wheel is rotated, a central gear-wheel loose upon the crank-shaft, pinions gearing into the same and into the teeth of the gear within the chain-wheel, stationary supports for the intermediate pinions, a disk permanently connected with the crank-shaft, an inclosing face-plate, and pawls acting in opposite directions, whereby the crank-shaft is directly connected with the chain-wheel when revolved in one direction and intermediately connected by the gearing with such chain when revolved in the opposite direction, substantially as set forth.

2. The combination, with the crank-shaft and pedals, of a stationary bearing through which the crank-shaft passes, a chain-wheel and hub revolving around the tubular bearing, such chain-wheel having internal gear-teeth, a gear-wheel loose upon the crank-shaft, intermediate gear-wheels between the center gear-wheel and the internal gear of the chain-wheel, fixed bearings supported by the tubular bearing and receiving such intermediate pinions, a disk upon the crank-shaft having a rim, pawls pivoted to such rim and acting at their inner ends upon a cylindrical flange of the center gear-wheel, a recessed face-plate inclosing the gearing and screwed to the chain-wheel, and pawls connected to the rim of the face-plate and acting inwardly against the edge of the disk, substantially as and for the purposes set forth.

3. The combination, with the chain-wheel, the fixed bearing, and the crank-shaft and pedals, of a sun or planet gear between the crank-shaft and chain-wheel, pawls acting in opposite directions, and an inclosing face-plate whereby the entire gear is protected from dust and dirt and the chain-wheel is directly connected to the crank-shaft when the latter is revolved in one direction and intermediately connected to the gearing when the crank-shaft is revolved in the other direction, substantially as set forth.

Signed by me this 21st day of September, 1891.

CHARLES VOGEL.

Witnesses:
GEO. T. PINCKNEY,
WILLIAM G. MOTT.